United States Patent

Harkins, Jr.

[15] 3,676,317

[45] July 11, 1972

[54] SPUTTER ETCHING PROCESS

[72] Inventor: Patrick A. Harkins, Jr., El Cajon, Calif.

[73] Assignee: Stromberg Datagraphix, Inc., San Diego, Calif.

[22] Filed: Oct. 23, 1970

[21] Appl. No.: 83,295

[52] U.S. Cl. ....204/192

[51] Int. Cl. ....C23c 15/00

[58] Field of Search ....204/192, 298

[56] References Cited

UNITED STATES PATENTS 3,410,774 11/1968 Barson et al. ....204/298

3,474,021 10/1969 Davidse et al. ....204/192

*Primary Examiner*—G. L. Kaplan

*Assistant Examiner*—Sidney S. Kanter

*Attorney*—John R. Duncan

[57] ABSTRACT

A process of etching high resolution openings in surfaces by sputter etching is disclosed. A mask is first prepared having apertures of shapes corresponding to areas to be etched on a surface. A low sputtering yield material is coated onto the mask. The mask is then placed in a suitable chamber between a source of accelerated and bombard the mask and the body surface beyond mask apertures, atoms are dislodged from the bombarded surfaces and diffuse away. Preferably, this etching action is more rapid on the body than on the mask coating. The low yield coating is reformed as necessary. The mask may be made of any solid material, including those which would be rapidly destroyed if used in a sputter etching system without the low sputtering yield coating.

5 Claims, 2 Drawing Figures

INVENTOR.
PATRICK A. HARKINS, JR.
BY John R Duncan
ATTORNEY

SPUTTER ETCHING PROCESS

BACKGROUND OF THE INVENTION

Very accurate, high resolution surface depressions and apertures are required in many devices. Typically, the masks used in integrated circuit manufacture, and the character matrices used in shaped beam cathode ray tubes require high resolution, accurately spaced apertures in thin metal foils. Also, in many integrated circuits and other semiconductor applications, accurate localized surface etching is required.

In the past, such etching has generally been accomplished by coating the surface with a photoresist, exposing it to a light image to harden exposed areas, washing away unexposed areas, treating the surface with a chemical etching solution which dissolves the surface without attacking the photoresist, and finally removing the hardened photoresist. This process is complex, with many critical steps. Also, the chemical etching solution tends to undercut the photoresist mask, causing a loss of resolution and forming apertures having walls which are not perpendicular to the surface. Crystalline materials dissolve non-uniformly, depending upon grain orientation. Some solvents preferentially etch the material along grain boundaries, resulting in irregular etched surfaces. Some materials are resistant to the etching solutions used with photoresist materials.

Recently cathode sputtering techniques have been developed. These techniques are useful both in coating a surface and in removing material from a surface. In these processes, a metal surface is placed in a chamber containing an inert gas at a pressure ranging from a few to about 100 microns of mercury. An anode is placed adjacent to but spaced from the surface. When a high voltage is applied between the anode and the surface, which functions as a cathode, glow discharge occurs. The resultant positive gas ions are accelerated, toward the cathode. The resulting ion bombardment causes atoms to be ejected from the cathode surface. The ejected atoms diffuse away, depositing on the anode or some other surface. If an apertured mask is placed against the cathode surface, atoms will be ejected only from the bombarded exposed areas of the surface. Thus, high resolution, straight-walled, depressions or apertures are formed in the cathode surface.

Unfortunately, atoms are also ejected from the mask surface, which is also subjected to intense ion bombardment. This process is uneconomical unless the mask can be made to last through several surface etching sequences. If the mask is made of a low sputtering yield material and the surface to be etched consists of a high sputtering yield material, the mask will have a relatively long life. However, many of the materials, such as molybdenum, which are most useful in cathode ray tube applications are low sputtering yield materials, while materials, such as copper, from which masks can be easily fabricated, are high sputtering yield materials. The life of a mask in such a system is very limited. Since the masks must be manufacturered to at least as high accuracy and resolution as is desired in the final object to be etched, the process is uneconomical with short-lived, high sputtering yield, masks.

Thus, there is a continuing need for improved techniques for the production of highly accurate apertures or depressions in metal surfaces.

SUMMARY OF THE INVENTION

An object, therefore, of this invention is to provide a high resolution etching process overcoming the above-noted problems.

Another object of this invention is to provide an etching process capable of producing highly accurate, straight-walled apertures or depressions in a metal surface.

Still another object of this invention is to provide a high resolution metal etching process of improved simplicity and reliability with lower cost.

Yet another object of this invention is to provide an etching process capable of producing high resolution apertures in a wide variety of compositions.

The above objects, and others, are accomplished in accordance with this invention by a process comprising the steps of forming a mask of an easily fabricated material, coating the mask with a very low sputtering yield material, placing the uncoated side of the mask adjacent the surface to be etched, placing the assembly in a cathode sputtering chamber, and operating the system with the surface to be etched as the cathode, whereby high resolution depressions or apertures are etched in exposed areas of the surface relatively rapidly, while the mask coating is etched relatively slowly.

Depending upon the relative sputtering yields of the surface to be etched and of the coating, from one to very many surfaces may be etched before the coating must be renewed. Because the mask itself is not attacked, great care may be used in its manufacture, since it may be recoated many times and can be used to produce a great many identically etched surfaces.

In such applications as color television shadow masks and shaped beam cathode ray tube matrices, it is desirable that the metal used be non-magnetic, and resistent to damage from heat and electron bombardment. In the past, desirable materials, such as molybdenum, have been little used since they are not easily etched by chemical means. Attempts to use cathode sputtering techniques on an economical, production, basis had been generally unsuccessful, since the sputtering yield of these materials is lower than the yield of materials, such as copper, from which masks could be economically fabricated by chemical etching processes. By coating the mask with a very low sputtering yield material, such as silicon monoxide, the cathode sputtering process has been made reliable, economical, and suitable for mass production.

BRIEF DESCRIPTION OF THE DRAWING

Details of the invention will be further understood upon reference to the drawing, wherein.

DETAILED DESCRIPTION OF THE INVENTION

Figure 1:
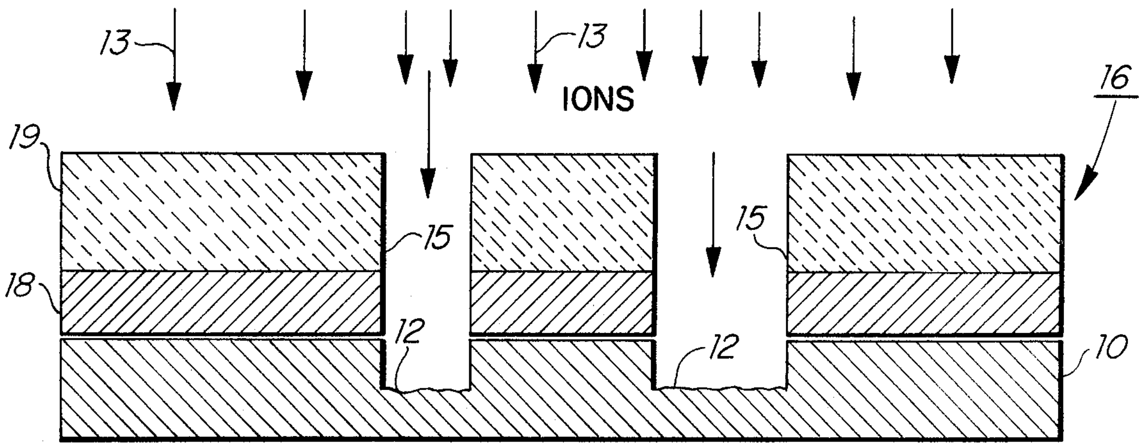
FIG. 1 shows a schematic section through a sputter etch mask assembly.

Referring now to FIG. 1, there is seen a schematic section through a portion of a mask and foil assembly useful in the process of this invention. The foil 10 has partially etched depressions 12 which have been etched by the action of ions directed against the upper surface of the assembly as indicated by arrows 13. These depressions 12 will continue to deepen under ion bombardment until apertures through foil 10 are formed. Depressions 12 correspond to openings 15 in mask 16. Mask 16 is a composite consisting of a sheet 18 of a material in which high resolution apertures 15 may be easily formed, overcoated with a coating 19 of a low sputtering yield material.

The foil 10 which is to be selectively etched may comprise any suitable material. This material may be chosen for desired characteristics in its final application after etching, with no restrictions relating to etchability. The material may be a high or low sputtering yield material, although the process of this invention is most advantageous with low sputtering yield materials. For cathode ray tube applications, it is generally desirable that the material be non-magnetic and be resistant to thermal or electron bombardment damage. Materials used for matrices for shaped beam cathode ray tubes should also be resistant to vibration fatigue damage and have high tensile strength. A preferred material for this application has been found to comprise molybdenum, which has the desired characteristics to a high degree. In the past, however, molybdenum was not used because of its poor chemical etching characteristics and its very low sputtering yield in conventional cathode sputtering systems.

Mask sheet 18 in composite mask 16 may comprise any suitable material. Since the surface of sheet 18 is not subjected to ion bombardment, materials with high sputtering yields may be used. Therefore, sheet 18 may be selected for ease of forming high resolution apertures. Since the mask has a relatively long life, extra care may be employed in forming very accurate apertures. Copper and beryllium copper alloys have been found to be highly desirable for use in the mask, since accurate masks may be formed easily by conventional chemical etching processes.

Any suitable low sputtering yield material may be used for coating 19 in composite mask 16. Desirably, the coating material will adhere well to sheet 18 and will be easily applied by a conventional method, such as vacuum deposition. Excellent results are obtained with silicon monoxide. Silicon monoxide has a very low sputtering yield and may be easily vacuum deposited. Therefore, silicon monoxide is preferred. Coating 19 will, of course, be gradually etched away since it is subjected to the intense ion bombardment. However, the low yield coating will have a relatively long life, and can be reformed as necessary.

Figure 2:
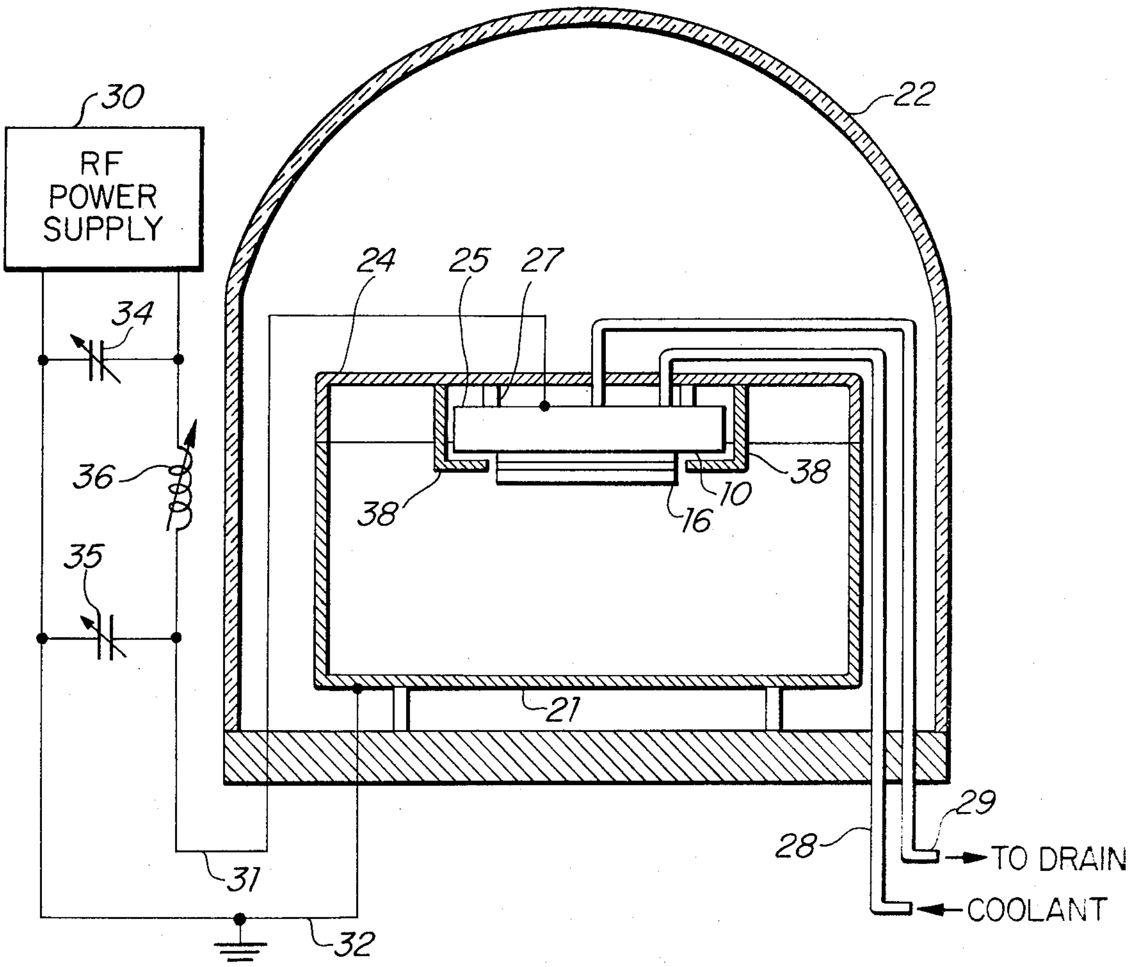
FIG. 2 shows a schematic representation of an apparatus suitable for use in the method of this invention.

FIG. 2 shows a schematic representation of a typical apparatus for carrying out the method of this invention.

A conductive box 21 which serves both as an anode and a shield for the system is supported within a bell jar 22. A conventional pumping system (not shown) is provided to pump gases from bell jar 22.

Box 21 includes a conductive lid 24 from which a plate 25 is supported by insulating supports 27. Cooling channels are provided within plate 25, which is preferably made of a material, such as copper, having high thermal conductivity. A cooling liquid, such as water, is piped to said channels through inlet pipe 28 and drained therefrom through drain pipe 29.

The assembly of mask 16 and foil 10, as seen in FIG. 1, is held in place against plate 25 with the coated surface facing downwardly.

A radio frequency, high voltage, power supply 30 is connected to foil 10 through wire 31 and plate 25 and to anode-shield 21 through wire 32, which is grounded. For maximum power transfer, an impedance network consisting of variable capacitors 34 and 35 and coil 36 is provided to match the impedance of the sputtering system to the power supply. Of course, any other suitable impedance matching network may be used.

When a high potential is applied between foil 10 operating as a cathode and anode-shield 21, glow discharge fills the inter-electrode space everywhere except for a thin region close to the cathode; this region is known as Crooke's dark space. Nearly the entire voltage difference between the anode and cathode appears across this space. If the anode is placed closer to the cathode than the distance of Crooke's dark space, the glow cannot be supported. A cathode shield 38 is provided to prevent glow discharge on portions of the cathode other than foil 10. Shield 38 is spaced from plate 25 a distance just less than Crooke's dark space.

The rate at which atoms are sputtered off foil 10 depends upon the number of ions which strike it in unit time and on the sputtering yield (atoms ejected per ion) of the material. The ion density in the chamber, the anode-cathode potential difference, and the materials used all influence the rate of sputtering.

While the chamber may contain any suitable ions at any suitable pressure, generally it is preferred that an inert gas at a pressure of from about $10^{-1}$ to $10^{-3}$ torr be used. Best results have generally been obtained with krypton at a pressure of about $10^{-2}$ torr. While the preferred frequency and voltage are dependent on many factors, generally with a molybdenum foil and krypton gas, a potential difference of about 2,500 to about 4,000 volts at a frequency of 13.56 megacycles produces best results.

The following examples point out preferred embodiments of the process of the present invention. Parts and percentages are by weight, unless otherwise indicated.

EXAMPLE I

A sheet of beryllium copper foil having a thickness of about 0.0006 inch is coated with an about 5 micron layer of photoresist material available under the trademark KPR–1 from the Eastman Kodak Co. The layer is exposed to a pattern of actinic radiation which hardens exposed areas. Then unexposed areas are washed away with trichlorethylene. The surface is treated with concentrated nitric acid for a period sufficient to form apertures through the foil in areas not protected by the photoresist. The hardened photoresist is then removed with Amerace Formula 676, a solvent mixture available from the Amerace Corporation. The pattern used produces a plurality of closely spaced alphanumeric charactershaped openings such as are shown in U.S. Pat. No. 3,500,100. The foil is then placed in a conventional vacuum evaporation chamber and a layer of silicon monoxide is coated onto one surface of the foil to a thickness of about 0.0005 inch. The uncoated surface of the mask thus produced is placed in contact with a molybdenum foil having a thickness of about 0.0006 inch. The assembly is placed in a cathode sputtering chamber as shown in FIG. 2. Gases are removed from the chamber and it is filled with krypton at a pressure of about $10^{-2}$ torr. The power supply is activated, and about 3 kilovolts is imposed between the anode and the cathode, at a frequency of about 13.56 MHz. Meanwhile, cooling water is circulated through the foil support plate to limit the temperature rise. The power supply is turned off after cathode sputtering has continued for a time sufficient to form apertures through the molybdenum foil. The apertures are found to be of excellent quality. Little degradation of the mask coating is seen.

EXAMPLE II

A composite mask is prepared by the photoresist, chemical etching and vacuum evaporation coating process described in Example I, except that here the coating consists of an about 0.0007 inch layer of niobium. The mask is placed in the sputtering chamber in contact with an about 0.0005 inch thick titanium foil. An argon atmosphere at about $5 \times 10^{-3}$ torr is maintained in the chamber. The power supply is operated at about 4 kilovolts and a frequency of about 27.12 MHz for a time sufficient to form apertures in the foil corresponding to the mask openings. Excellent apertures are formed in the titanium foil conforming closely to the mask openings. Little wear of the mask coating is seen.

EXAMPLE III

A composite mask is prepared as described in Example I. The mask is placed with its uncoated surface against a beryllium copper foil having a thickness of about 0.0006 inch. The composite is placed in a cathode sputtering chamber of the sort shown in FIG. 1. A neon atmosphere is maintained in the chamber at a pressure of about 0.05 torr. The power supply is operated at about 2.5 KV and a frequency of about 13.56 MHz for a time sufficient to form apertures in the foil corresponding to the mask aperture. Three additional beryllium copper foils are etched in the same manner with the single mask. The resulting apertured foils are of excellent quality and are substantially identical. The mask shows only slight wear on the exposed coating surface.

While specific components, ingredients and proportions are recited in the above examples, these may be varied, and other materials used, where suitable, as discussed above. Additional ingredients may be included in the foils, coating, chamber atmosphere, etc., to enhance or otherwise modify their characteristics.

Additional modifications and applications of this invention will occur to those skilled in the art upon reading this disclosure. These are intended to be included within the scope of this invention as defined in the appended claims.

I claim:

1. A method of preparing shaped beam cathode ray tube matrices by high resolution selective area etching which comprises the steps of:

a. preparing a metal mask sheet having alphanumeric character apertures corresponding to the areas to be etched;

b. forming a layer on one surface of said mask sheet comprising silicon monoxide;

c. placing the uncoated surface of said mask sheet adjacent to a metal foil surface to be etched; and d. subjecting the resulting composite to intense ion bombardment, whereby atoms in areas on said surface corresponding to said apertures are ejected, etching away said surface in said areas until apertures corresponding to said areas are produced in said foil.

2. The method according to claim 1 wherein said surface to be etched comprises molybdenum.

3. The method according to claim 2 wherein said intense ion bombardment is conducted in a chamber containing an inert gas at a pressure of from about $10^{-1}$ to $10^{-3}$ torr.

4. The method according to claim 3 wherein said inert gas comprises krypton.

5. The method according to claim 4 wherein said surface to be etched is operated as the cathode in a cathode sputtering system, with a potential of from about 2,500 to about 4,000 volts imposed between said cathode and an anode.

* * * * *